(12) United States Patent
Ekbal et al.

(10) Patent No.: US 8,837,307 B2
(45) Date of Patent: *Sep. 16, 2014

(54) TWO-WAY RANGING MESSAGING SCHEME

(75) Inventors: Amal Ekbal, San Diego, CA (US);
David Jonathan Julian, San Diego, CA (US); Petru Cristian Budianu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 573 days.

This patent is subject to a terminal disclaimer.

(21) Appl. No.: 12/875,262

(22) Filed: Sep. 3, 2010

(65) Prior Publication Data
US 2011/0292819 A1    Dec. 1, 2011

Related U.S. Application Data

(60) Provisional application No. 61/348,460, filed on May 26, 2010.

(51) Int. Cl.
*H04W 64/00* (2009.01)
*G01S 13/76* (2006.01)

(52) U.S. Cl.
CPC .................................. *G01S 13/765* (2013.01)
USPC ........................ 370/252; 342/458; 455/456.1

(58) Field of Classification Search
None
See application file for complete search history.

(56) References Cited

U.S. PATENT DOCUMENTS

| | | | |
|---|---|---|---|
| 3,602,825 A | 8/1971 | Senior | |
| 4,115,773 A | 9/1978 | Metcalf | |
| 4,455,556 A | 6/1984 | Koshio et al. | |
| 5,555,277 A | 9/1996 | Lawrence et al. | |
| 6,414,635 B1 | 7/2002 | Stewart et al. | |
| 6,697,629 B1 | 2/2004 | Grilli et al. | |
| 7,151,759 B1 | 12/2006 | Ryan et al. | |
| 7,653,004 B2 * | 1/2010 | Strutt | 370/252 |
| 7,710,321 B2 * | 5/2010 | Heidari-Bateni et al. | 342/458 |
| 7,719,994 B2 * | 5/2010 | Zumsteg | 370/252 |
| 7,739,705 B2 | 6/2010 | Lee et al. | |

(Continued)

FOREIGN PATENT DOCUMENTS

| CN | 101251594 A | 8/2008 |
|---|---|---|
| EP | 1667321 A1 | 6/2006 |

(Continued)

OTHER PUBLICATIONS

International Search Report and Written Opinion—PCT/US2010/061930, ISA/EPO—May 4, 2011.

(Continued)

*Primary Examiner* — Hassan Kizou
*Assistant Examiner* — Roberta A Shand
(74) *Attorney, Agent, or Firm* — Paul S. Holdaway

(57) ABSTRACT

In a two-way ranging scheme where a first apparatus (e.g., device) determines a distance to a second apparatus (e.g., device), specified packets are sent between these apparatuses at specified times to facilitate the determination of the distance. In some aspects, these packets may be defined and/or sent in a manner that enables the apparatuses to detect a leading edge of a received packet with a high degree of accuracy. For example, an apparatus may transmit a packet a defined period of time after transmitting or receiving another packet. In addition, a packet may comprise a defined symbol sequence that is used by an apparatus that receives the packet to identify a leading edge of the packet.

37 Claims, 13 Drawing Sheets

(56) References Cited

U.S. PATENT DOCUMENTS

| | | |
|---|---|---|
| 7,817,762 B2 | 10/2010 | Johnstone et al. |
| 7,822,098 B2* | 10/2010 | Sahinoglu ............... 375/130 |
| 8,036,064 B2 | 10/2011 | McFarland |
| 8,552,903 B2 | 10/2013 | Julian et al. |
| 2003/0053493 A1* | 3/2003 | Mobley et al. ............ 370/538 |
| 2003/0147655 A1 | 8/2003 | Shattil |
| 2004/0005022 A1 | 1/2004 | Zhu et al. |
| 2004/0058653 A1 | 3/2004 | Dent |
| 2005/0058081 A1* | 3/2005 | Elliott ..................... 370/252 |
| 2006/0120441 A1 | 6/2006 | Nakagawa et al. |
| 2007/0165756 A1 | 7/2007 | Lachartre |
| 2007/0200759 A1 | 8/2007 | Heidari-Bateni et al. |
| 2007/0243843 A1 | 10/2007 | Shalash |
| 2007/0258548 A1 | 11/2007 | Sutton |
| 2007/0276616 A1 | 11/2007 | Wilcox |
| 2008/0043824 A1 | 2/2008 | Jacobs et al. |
| 2008/0056419 A1 | 3/2008 | Lee et al. |
| 2008/0225758 A1 | 9/2008 | Proctor et al. |
| 2008/0252517 A1 | 10/2008 | Fuchs et al. |
| 2009/0033399 A1 | 2/2009 | Schwoerer et al. |
| 2009/0149132 A1 | 6/2009 | LeFever et al. |
| 2009/0149202 A1* | 6/2009 | Hill et al. ............... 455/456.6 |
| 2009/0170458 A1 | 7/2009 | Molisch et al. |
| 2009/0310586 A1 | 12/2009 | Shatti |
| 2010/0045508 A1* | 2/2010 | Ekbal et al. ............... 342/145 |
| 2010/0046388 A1 | 2/2010 | Kim et al. |
| 2010/0054322 A1 | 3/2010 | Hui et al. |
| 2010/0112967 A1 | 5/2010 | Sorensen |
| 2011/0019002 A1 | 1/2011 | Jagmohan et al. |
| 2011/0068966 A1 | 3/2011 | Daniels et al. |
| 2011/0216816 A1 | 9/2011 | Frenzel |
| 2011/0222373 A1 | 9/2011 | Lee |
| 2011/0292820 A1 | 12/2011 | Ekbal et al. |
| 2011/0294449 A1 | 12/2011 | Budianu et al. |
| 2011/0294450 A1 | 12/2011 | Budianu et al. |
| 2011/0316747 A1 | 12/2011 | Budianu et al. |
| 2012/0001783 A1 | 1/2012 | Eklund et al. |
| 2012/0157205 A9 | 6/2012 | Danieli et al. |
| 2014/0009340 A1 | 1/2014 | Meador et al. |

FOREIGN PATENT DOCUMENTS

| | | | |
|---|---|---|---|
| GB | 2267192 | A | 11/1993 |
| GB | 2419046 | A | 4/2006 |
| JP | H02223882 | A | 9/1990 |
| JP | 2005520139 | A | 7/2005 |
| JP | 2008522181 | A | 6/2008 |
| JP | 2008527769 | A | 7/2008 |
| JP | 2008538065 | A | 10/2008 |
| JP | 2009150872 | A | 7/2009 |
| JP | 2009535625 | A | 10/2009 |
| JP | 2010050964 | A | 3/2010 |
| WO | 9716700 | A1 | 5/1997 |
| WO | 0193446 | A2 | 12/2001 |
| WO | 2005109634 | A1 | 11/2005 |
| WO | WO-2006098790 | | 9/2006 |
| WO | WO-2006112850 | A1 | 10/2006 |
| WO | 2007011357 | A1 | 1/2007 |
| WO | WO-2007121476 | A1 | 10/2007 |
| WO | WO-2007121488 | A1 | 10/2007 |
| WO | WO-2007127721 | A2 | 11/2007 |
| WO | WO2007127886 | A2 | 11/2007 |
| WO | 2008022460 | A1 | 2/2008 |
| WO | WO2009110669 | A1 | 9/2009 |
| WO | 2009128590 | A1 | 10/2009 |
| WO | WO-2009144582 | | 12/2009 |
| WO | WO-2010022273 | A1 | 2/2010 |

OTHER PUBLICATIONS

International Search Report and Written Opinion—PCT/US2010/061928, International Search Authority—European Patent Office—Apr. 8, 2011.

Han Yalan et al., "Research on Two-way Ranging-Based High Precision Clock Synchronization Method for Pseudo Satellite Network" (Research on High-precision Time Synchronization of Pseudolites Based on Bidirectional Ranging), Telemetering and telecontrol (Journal of Telemetry, Tracking and Command), May 2010, vol. 31, No. 3, 5pp.

* cited by examiner

TWO-WAY RANGING MESSAGING SCHEME

CLAIM OF PRIORITY

This application claims the benefit of and priority to commonly owned U.S. Provisional Patent Application No. 61/348,460, filed May 26, 2010, the disclosure of which is hereby incorporated by reference herein.

CROSS-REFERENCE TO RELATED APPLICATION

This application is related to concurrently filed and commonly owned U.S. patent application Ser. No. 12/875,278, entitled "TWO-WAY RANGING MESSAGING SCHEME," the disclosure of which is hereby incorporated by reference herein.

BACKGROUND

1. Field of the Invention

This application relates generally to two-way ranging and more specifically, but not exclusively, to a messaging scheme for two-way ranging.

2. Relevant Background

Distance ranging involves determining a distance between two locations. In a typical scenario, a ranging device measures a distance from the ranging device to another object. Here, the ranging device may determine the amount of time it takes for a signal to travel between the ranging device and the other object. The ranging device may then estimate the distance based on the signal propagation time and the known propagation speed of the signal (e.g., estimated as the speed of light). A ranging device may employ a variety of technologies such as laser, radar, sonar, and various forms of radio-frequency (RF) signaling. For convenience, the term distance ranging will be referred to herein simply as ranging.

In some cases, a two-way ranging scheme may be employed to determine the distance between two devices. FIG. 1 illustrates a simplified example of ranging signal timing for two devices (e.g., wireless devices) performing a two-way ranging operation. Here, a device A may determine the distance to a device B based on a round-trip time associated with signals transmitted by the devices. For example, distance may be estimated based on the equation: $D=T_P*C$, where D is the estimated distance, $T_P$ is the signal propagation delay from one device to the other, and C is the speed of light. The signal propagation delay $T_P$ may be estimated based on the round-trip time as discussed below.

The signals of FIG. 1 are depicted in a simplified form for purposes of illustration. Here, a device B generates a signal 102 that is transmitted over-the-air (as represented by an arrow 104) to a device A. This signal is received at the device A (as represented by a signal 106) after a propagation time represented by a time period arrow 108. Following a turnaround time period (as represented by a time period arrow 110) after receiving the signal 106, the device A generates a signal 112 that is transmitted over-the-air (as represented by an arrow 114) to the device B. This signal is received at the device B (as represented by a signal 116) after a propagation time represented by a time period arrow 118. Each device generates a timing indication (hereafter referred to, for convenience, as a timestamp) associated with the transmission and reception of these signals. For example, the devices A and B may record transmit timestamps at $T_{3A}$ and $T_{1B}$, respectively, and the devices A and B may record receive timestamps at $T_{2A}$ and $T_{4B}$, respectively. Based on these timestamps, an estimated propagation delay $T_P$ (e.g., corresponding to time period arrow 108 or 118) may be computed. For example, a round-trip time estimate may be determined according to: $2T_P=(T_{4B}-T_{1B})-(T_{3A}-T_{2A})$. Here, $T_{1B}$, $T_{2A}$, $T_{3A}$, and $T_{4B}$ are measurable. In addition, device B may send to device A an indication of the time period between $T_{1B}$ and $T_{4B}$ (represented by a time period arrow 120) measured by device B. Consequently, device A may calculate the round-trip time based on the indication received from device B (the time period arrow 120) and the turnaround time measured by device A (the time period arrow 110).

In the two-way ranging scheme described in FIG. 1, various types of information are sent from one device to another. Accordingly, a need exists for an effective technique for exchanging this information and/or other similar information to accomplish two-way ranging.

SUMMARY

A summary of several sample aspects of the disclosure follows. This summary is provided for the convenience of the reader and does not wholly define the breadth of the disclosure. For convenience, the term "some aspects" may be used herein to refer to a single aspect or multiple aspects of the disclosure.

The disclosure relates in some aspects to a two-way ranging scheme where a first apparatus (e.g., device) determines (e.g., estimates) a distance to a second apparatus. Here, specified packets are sent between these apparatuses at specified times to facilitate the determination of the distance. In some aspects, these packets may be defined and/or sent in a manner that enables the apparatuses to detect a leading edge of a received packet with a high degree of accuracy. As a result, the distance between the apparatuses may be estimated with a high degree of accuracy.

During a data collection stage of the ranging scheme, the first apparatus transmits a first packet to the second apparatus. The second apparatus then transmits a second packet to the first apparatus a defined period of time after receiving the first packet. Here, the second packet may include a defined symbol sequence that the first apparatus uses to identify a leading edge associated with the second packet. In addition, after receiving the second packet, the first apparatus transmits a third packet to the second apparatus a defined period of time after transmitting the first packet. The third packet also may include a defined symbol sequence that the second apparatus uses to identify a leading edge associated with the third packet.

During a distance estimation stage of the ranging scheme, the second apparatus may transmit to the first apparatus an indication of the amount of time that elapsed between the time at which the second packet was sent (e.g., as recorded by the second apparatus) and the time at which the third packet was received (e.g., the time of receipt of the detected leading edge of the third packet). In some aspects, this elapsed time may correspond to the quantity $T_{4B}-T_{1B}$ discussed above. The first apparatus also determines the amount of time that elapsed between the time at which the second packet was received (e.g., the time of receipt of the detected leading edge of the second packet) and the time at which the third packet was sent (e.g., as recorded by the first apparatus). In some aspects, this elapsed time may correspond to the quantity $T_{3A}-T_{2A}$ discussed above. Accordingly, the first apparatus may estimate the distance between the apparatuses based on these elapsed time periods (e.g., the signal propagation round-trip time) as discussed above.

A ranging scheme as taught herein also may employ gain control. For example, the apparatuses may initiate gain control upon initiating two-way ranging to improve the accuracy of the distance estimation. Here, after initiating two-way ranging, the first apparatus may transmit a packet to the second apparatus. This packet may include a defined symbol sequence that the second apparatus uses to determine (e.g., select) a gain level for receiving packets during the data collection stage. The second apparatus then transmits a similar packet to the first apparatus a defined period of time after receiving the packet from the first apparatus. The packet sent by the second apparatus also may include a defined symbol sequence that the first apparatus uses to determine a gain level for receiving packets during the data collection stage.

A ranging scheme as taught herein also may employ drift compensation to improve the accuracy of the distance estimation. For example, the packet including the gain control symbol sequence sent by the first apparatus also may include a defined symbol sequence that the second apparatus uses to estimate clock drift between the two apparatuses. Accordingly, the second apparatus may adjust its clock during the two-way ranging operations to account for this drift. In this way, more accurate clock synchronization may be provided during ranging operations to provide more precise leading edge detection.

A ranging scheme as taught herein may involve defining one or more channels for ranging operations. For example, in a pulse-based ranging system, a channel may be defined by specifying a pulse repetition period and/or a pulse time hopping sequence. In some aspects the pulses may comprise ultra-wideband (UWB) pulses. For example, the pulses may have a pulse width on the order of four nanoseconds or less. In addition, these pulses may be transmitted using a relatively low duty cycle (e.g., such a pulse may be transmitted on the order of every 200 nanoseconds). Accordingly, the disclosure may relate in some aspects to techniques for implementing two-way ranging efficiently and accurately in ultra-low power (e.g., non-coherent) UWB radios.

BRIEF DESCRIPTION OF THE DRAWINGS

These and other sample aspects of the disclosure will be described in the detailed description and the appended claims that follow, and in the accompanying drawings, wherein:

Figure 1:
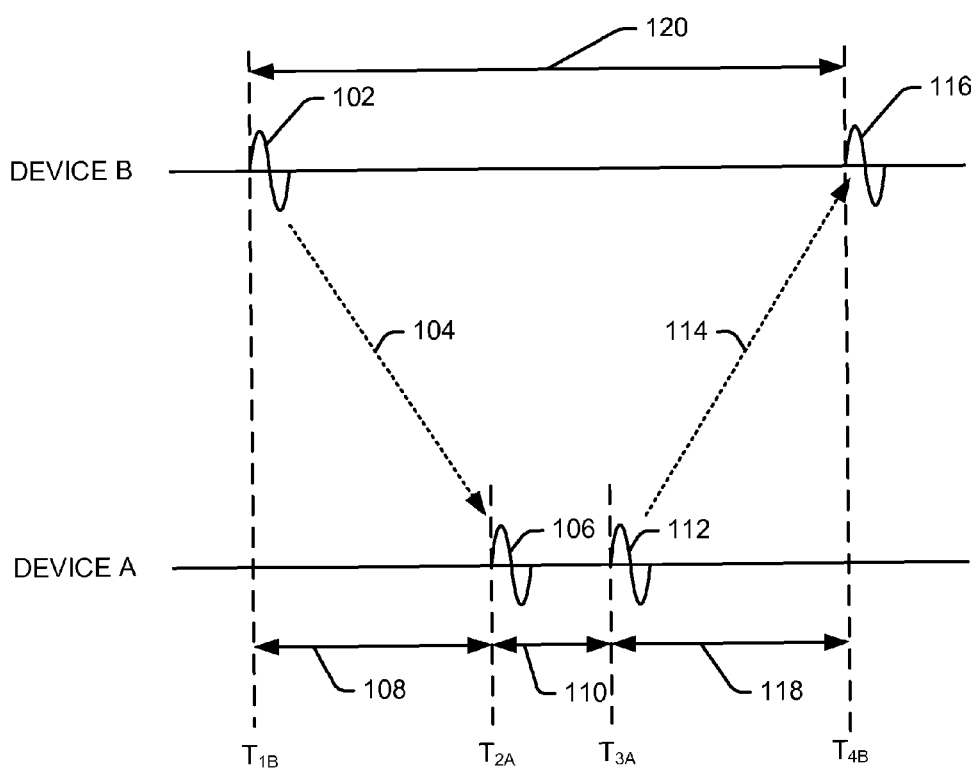
FIG. 1 is a simplified diagram illustrating sample two-way ranging signaling.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects, a method of wireless communication may comprise: transmitting a first packet from a first apparatus to a second apparatus; receiving a second packet from the second apparatus as a result of the transmission of the first packet; transmitting a third packet from the first apparatus to the second apparatus after the reception of the second packet; determining a first time value associated with the reception of the second packet and a second time value associated with the transmission of the third packet; receiving information from the second apparatus, wherein the information is indicative of a third time value associated with the transmission of the second packet and a fourth time value associated with the reception of the third packet; and determining a distance between the first apparatus and the second apparatus based on the first time value, the second time value, and the received information. In addition, in some aspects, the determination of the first time value may comprise detecting a leading edge associated with a first symbol sequence and determining a time of arrival of the leading edge.

Figure 2:
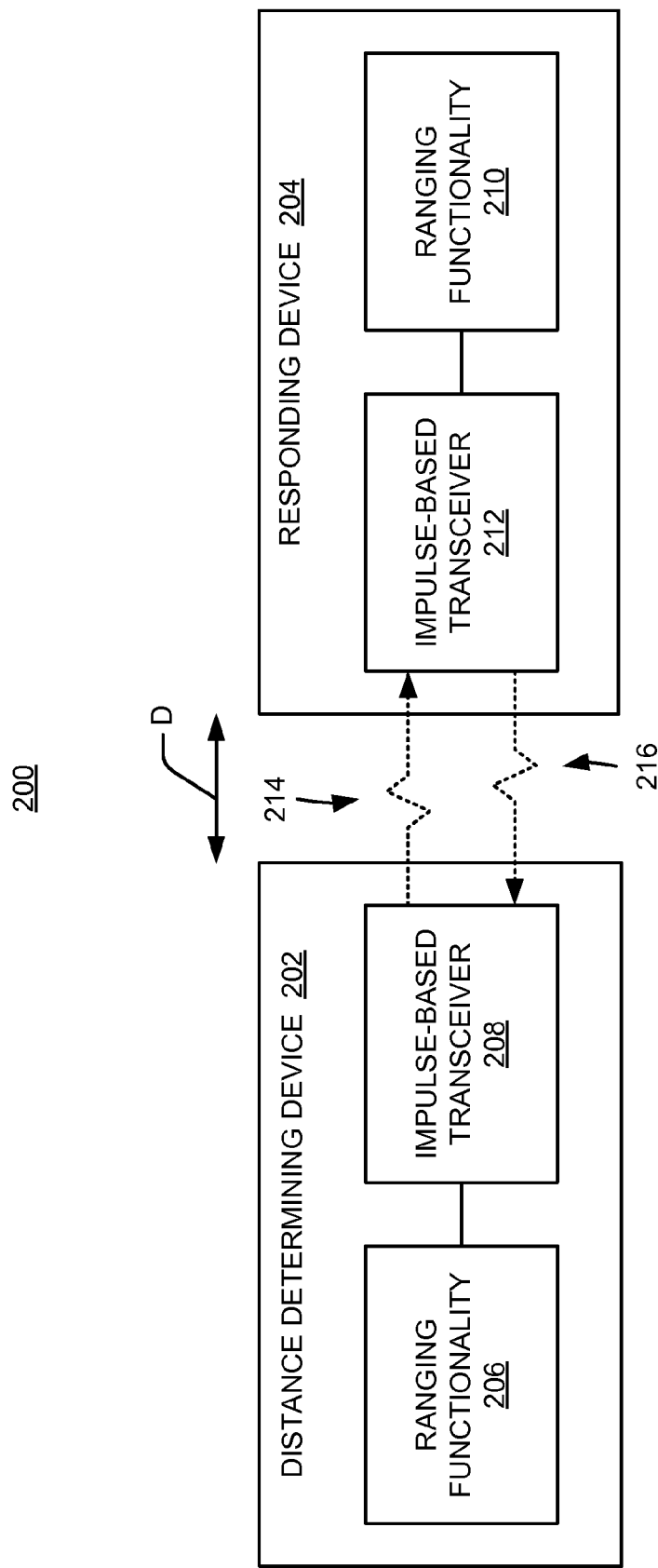
FIG. 2 is a simplified block diagram of a sample communication system adapted to perform ranging.

For purposes of illustration, various aspects of the disclosure will be described in the context of an impulse-based communication system 200 as shown in FIG. 2, where devices 202 and 204 (e.g., nodes) in the system are configured to transmit and receive pulses. In some cases, such a communication system may comprise a UWB system where the devices transmit and receive UWB pulses. It should be appreciated, however, that the teachings herein may be applicable to other types of communication systems, frequency bands, and devices.

In an UWB system, pulses with widths on the order of a nanosecond of less may be used for communication. The use of such narrow pulses also enables efficient implementation of accurate ranging operations. As will be discussed in more detail in conjunction with FIG. 8 below, a goal of a ranging operation may be to accurately identify the line-of-sight (LOS) path (e.g., the leading edge) of a received pulse and to estimate the time-difference (e.g., the propagation delay) between when the pulse was transmitted by one device and when the pulse was received by another device.

In some wireless systems (e.g., a system employing portable UWB devices), it is desirable to utilize low power and/or low cost devices. Such constraints may, however, limit the capabilities of these devices. For example, it may not be feasible to use coherent radios (which may provide a high-level of device synchronization) in ultra-low power and low cost devices because coherent radios may be relatively complex and/or have relatively high power consumption. Consequently, it may be more challenging to provide accurate leading edge detection in an ultra-low power device.

In the example of FIG. 2, the device 202 initiates a ranging operation to determine a distance D between the devices 202 and 204. In accordance with the teachings herein, the devices 202 and 204 employ a messaging scheme to facilitate leading edge detection and, in some aspects, facilitate gain control and drift compensation between devices to improve the accuracy of the leading edge detection. Here, ranging functionality 206 of the device 202 cooperates with an impulse-based transceiver 208 to send messages to and receive messages from the device 204. For example, the device 202 may send messages to the device 204 to request initiation of a ranging operation, provide clock drift information, provide gain control information, and provide ranging data (for leading edge detection). The transceiver 208 sends these messages via a series of pulses as represented by the symbol 214. Similarly, ranging functionality 210 of the device 204 cooperates with an impulse-based transceiver 212 to send messages to and receive messages from the device 202. For example, the device 204 may send messages to the device 202 to respond to the ranging request, provide gain control information, and provide ranging data (for leading edge detection). The transceiver 212 sends these messages via a series of pulses as represented by the symbol 216.

Sample operations of the system 200 will now be discussed in more detail in conjunction with the flowchart of FIGS. 3-5. For convenience, the operations of FIGS. 3-5 (or any other operations discussed or taught herein) may be described as being performed by specific components (e.g., the components of FIG. 2 or FIG. 10). It should be appreciated, however, that these operations may be performed by other types of components and may be performed using a different number of components. It also should be appreciated that one or more of the operations described herein may not be employed in a given implementation.

For illustration purposes, the following describes sample messages that take the form of packets. It should be appreciated, however, that messaging as taught herein may be implemented in other forms.

Figure 3:
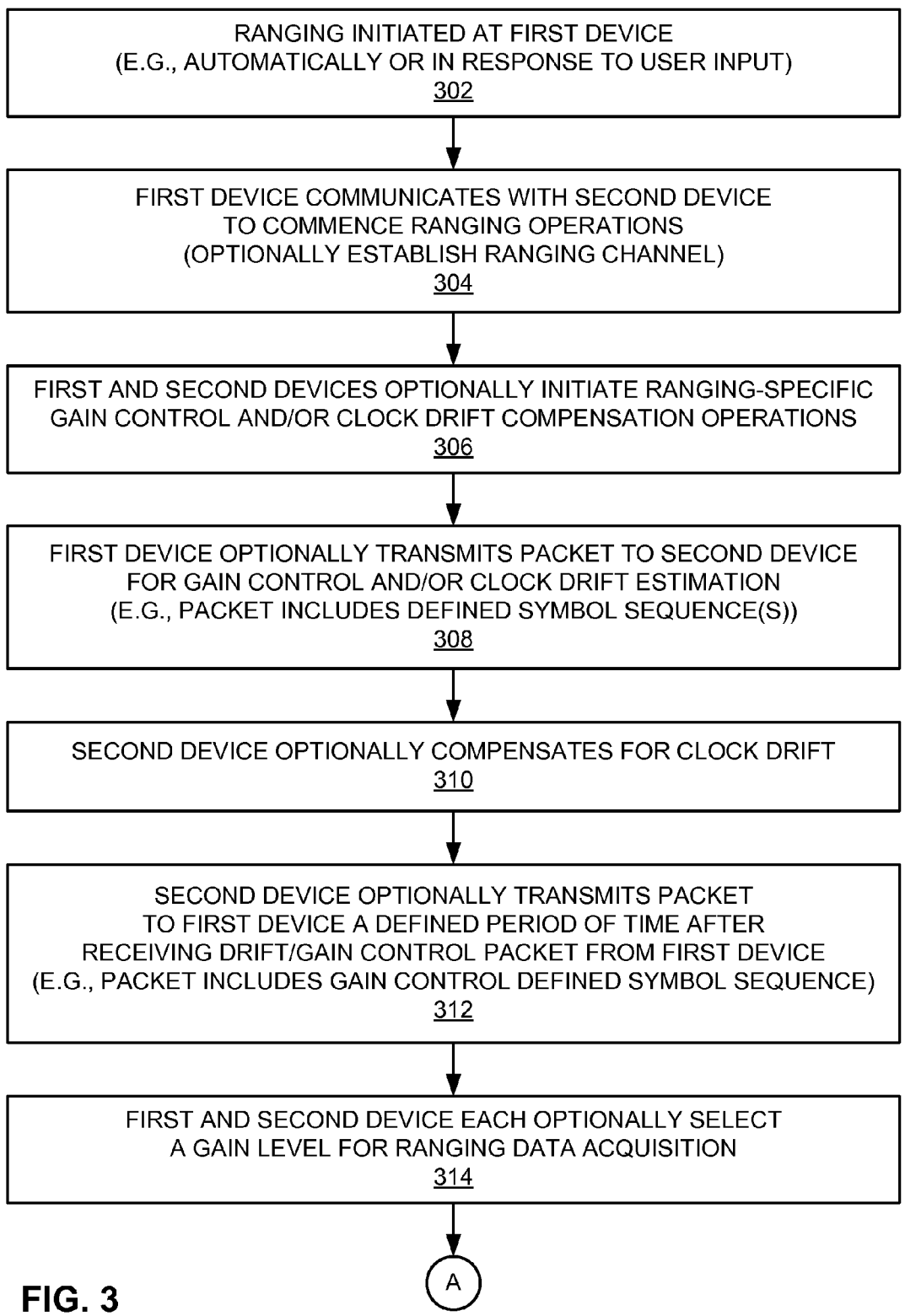
FIGS. 3-5 are a flowchart of several sample aspects of operations that may be performed to perform ranging.

Referring initially to FIG. 3, as represented by block 302, at some point in time a ranging operation is initiated at a first device (e.g., device 202). For example, in some cases a user of the first device (e.g., a wireless device) may interact with a user input device of that device to initiate a ranging operation between the first device and a second device (e.g., another wireless device). In other cases, the first device may automatically initiate a ranging operation. For example, upon discovering the existence of the second device (e.g., upon detection of signals from the other device), the first device may initiate a ranging operation with the second device to determine the distance between the devices. Such a ranging operation may be invoked, for example, to support other functionality of the first device that is dependent on the distance between the devices.

As represented by block 304, the first device communicates with the second device to commence ranging operations. For example, the first device may send a request to initiate ranging operations to the second device and the second device may send a corresponding response (e.g., accepting or denying the request).

As represented by block 306 (and as described at blocks 308-314 that follow), if the first and second devices agree to conduct a ranging operation, the first and second devices may optionally initiate ranging-specific gain control and/or clock drift compensation operations. In some aspects, these operations may be invoked to facilitate accurate leading edge detection. For example, during normal communication operations between devices, gain control may not be employed or a relatively simple form of gain control may be employed (e.g., to maintain low power consumption). However, to facilitate highly accurate leading edge detection (e.g., to enable ranging accuracy on the order of one foot or less), a more robust form of gain control may be invoked during ranging operations. Similarly, during normal communication operations between devices, clock drift compensation may not be employed or a relatively simple form of clock drift compensation may be employed (e.g., to maintain low power consumption). However, a more robust form of clock drift compensation may be invoked during ranging operations to facilitate accurate leading edge detection.

Figure 6:
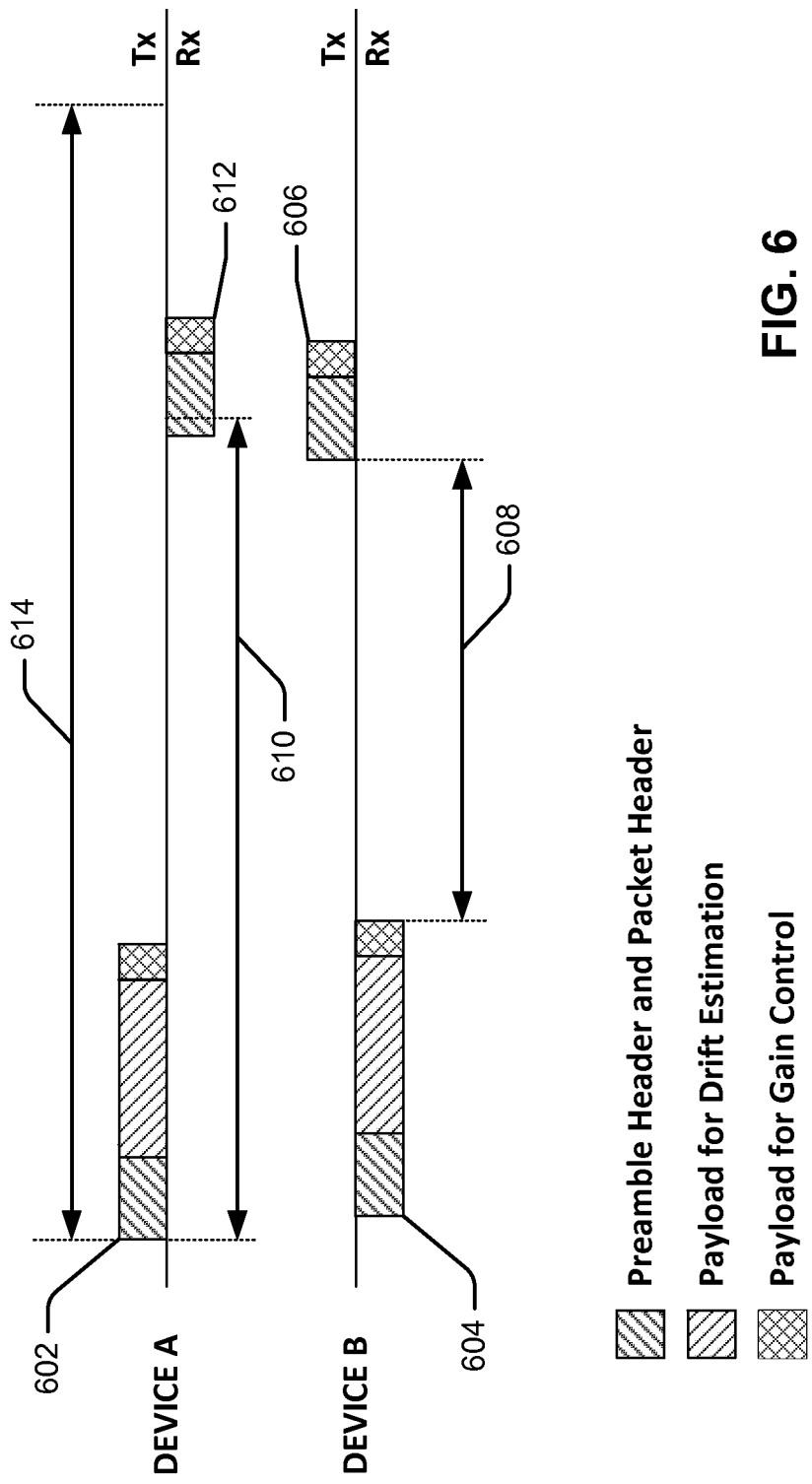
FIG. 6 is a simplified diagram illustrating sample messaging for configuring apparatuses to perform two-way ranging.

As represented by block 308, upon initiation of gain control and/or clock drift compensation, the first device transmits a packet to the second device to facilitate gain control and/or clock drift compensation at the second device. FIG. 6 illustrates an example of a packet 602 that may be sent by the first device (e.g., device A) to the second device (e.g., device B) for this purpose. The packet 602 includes a preamble header and packet header that may be used, for example, to facilitate acquisition at the second device of the pulses transmitted by the first device and to identify the packet (e.g., as an initial ranging packet). In implementations that employ drift compensation, the packet 602 includes a payload for drift estimation. The drift estimation payload may comprise, for example, a defined symbol sequence (e.g., a pseudorandom sequence) that is known by the first and second devices. In implementations that employ gain control, the packet 602 includes a payload for gain control. The gain control payload may comprise, for example, a defined symbol sequence (e.g., a pseudorandom sequence) that is known by the first and second devices. The symbol sequence for the drift estimation may be different from the symbol sequence for the gain control.

As represented by block 310, once the second device receives the packet sent at block 308, the second device may compensate for any relative clock drift between the first and second devices based on the information in the received packet. For example, in a case where the second device's clock is slower than the first device's clock, the second device may identify the relative clock drift by determining the frequency with which a missing symbol is detected in the received sequence at the second device. Alternatively, in a case where the second device's clock is faster than the first device's clock, the second device may identify the relative clock drift by determining the frequency with which a repeated symbol is detected in the received sequence at the second device. In the example of FIG. 6, the reception of the packet 602 at the second device (device B) is represented by the packet 604. Hence, in this case, the second device may use the payload for drift estimation from the packet 604 to determine the relative clock drift.

Once the second device determines the relative clock drift, the second device may adjust its clock (e.g., increase or decrease clock frequency) to compensate for the drift. Hence, as a result of the compensation, the clocks used by the first and second devices may be substantially synchronized (e.g., within 1 part-per-million). As a result, the ranging operations at the first and second devices may be configured such that each device may rely on the other device performing designated operations (e.g., sending packets) at certain times. Consequently, by specifying that certain packets are sent at specific times relative to the sending or receipt of other packets, the devices may more efficiently monitor for received packets. For example, in an UWB system, it may be assumed that any two devices in communication with one another may be relatively close to one another (e.g., at most 10 meters apart). Hence, given the known maximum signal propagation delay over this maximum distance, and the expected transmission time of a packet by the other device, a device may use a relatively narrow search window to search for that packet. Consequently, the power consumption associated with such a search may be kept relatively low as compared to the corresponding power consumption in device that does not employ the teachings herein. In some implementations, the first device may adjust its clock (e.g., increase or decrease clock frequency) to compensate for any clock drift between the first and second devices. For example, a packet exchange similar to the above may be employed whereby the second device sends a drift estimation payload to the first device to enable the first device to determine and then compensate for the relative clock drift.

As represented by block 312 of FIG. 3, as a result of the reception of the packet from the first device, the second device transmits a packet to the first device for gain control operations at the first device. FIG. 6 illustrates an example of a packet 606 that may be sent by the second device (e.g., device B) to the first device (e.g., device A) for this purpose. The packet 606 includes a preamble header and packet header that may be used, for example, to facilitate acquisition at the first device of the pulses transmitted by the second device and to identify the packet (e.g., identify the packet as a response to the initial ranging packet). In implementations that employ gain control, the packet 606 includes a payload for gain control. As discussed above at block 308, the gain control payload may comprise a defined symbol sequence (e.g., a pseudorandom sequence) that is known by the first and second devices.

As represented by the time period 608 in FIG. 6, the second device may transmit the packet 606 a defined period of time (e.g., a specified number of clock cycles) after receiving the packet 604. In this way, the first device may determine the time at which it should commence searching for this packet. In the example of FIG. 6, the packet 612 represents the reception of the packet 606 at the first device. Here, the first device may expect to receive the packet 612 as a result of the transmission of the packet 602. Moreover, the first device may expect to receive the packet 612 within a particular window of time (e.g., as discussed above) relative to the time of transmission of the packet 602. Thus, as represented by the time period 610, the first device commences signal acquisition operations a defined period of time (e.g., a specified number of clock cycles) after transmitting the packet 602.

The transmission of a packet a defined period of time after the transmission or reception of another packet may be implemented in various ways. For example, in some cases this may involve transmitting a specified portion of a packet a defined period of time (e.g., a specified number of clock cycles) after the transmission or reception of a specified portion of another packet. These specified portions may take various forms. For example, a specified portion may comprise a specific symbol, a specific pulse, a specific packet component (e.g., header or payload), and so on. In addition, various positions within the packet may be specified (e.g., the first symbol, the last symbol, etc.). Also, different portions may be specified for different packets.

As represented by block 314 of FIG. 3, upon receiving gain control information, each of the devices may select one or more gain levels to be used for subsequent operations. For example, the first device may select a gain level to be used during data acquisition operations for ranging based on the symbol sequence in the packet 612. Similarly, the second device may select a gain level to be used during data acquisition operations for ranging based on the symbol sequence in the packet 604.

Gain control may be implemented in a variety of way. In some implementations, signal energy-based gain control may be employed whereby gain (e.g., front-end RF receiver gain) is adjusted based on the signal energy present in a received signal (e.g., the symbol sequence) to limit error due to saturation. In other implementations (e.g., that do not incorporate received signal-based gain control), noise-based gain control may be employed whereby gain is adjusted based on the level of noise detected by the receiver.

Figure 4:
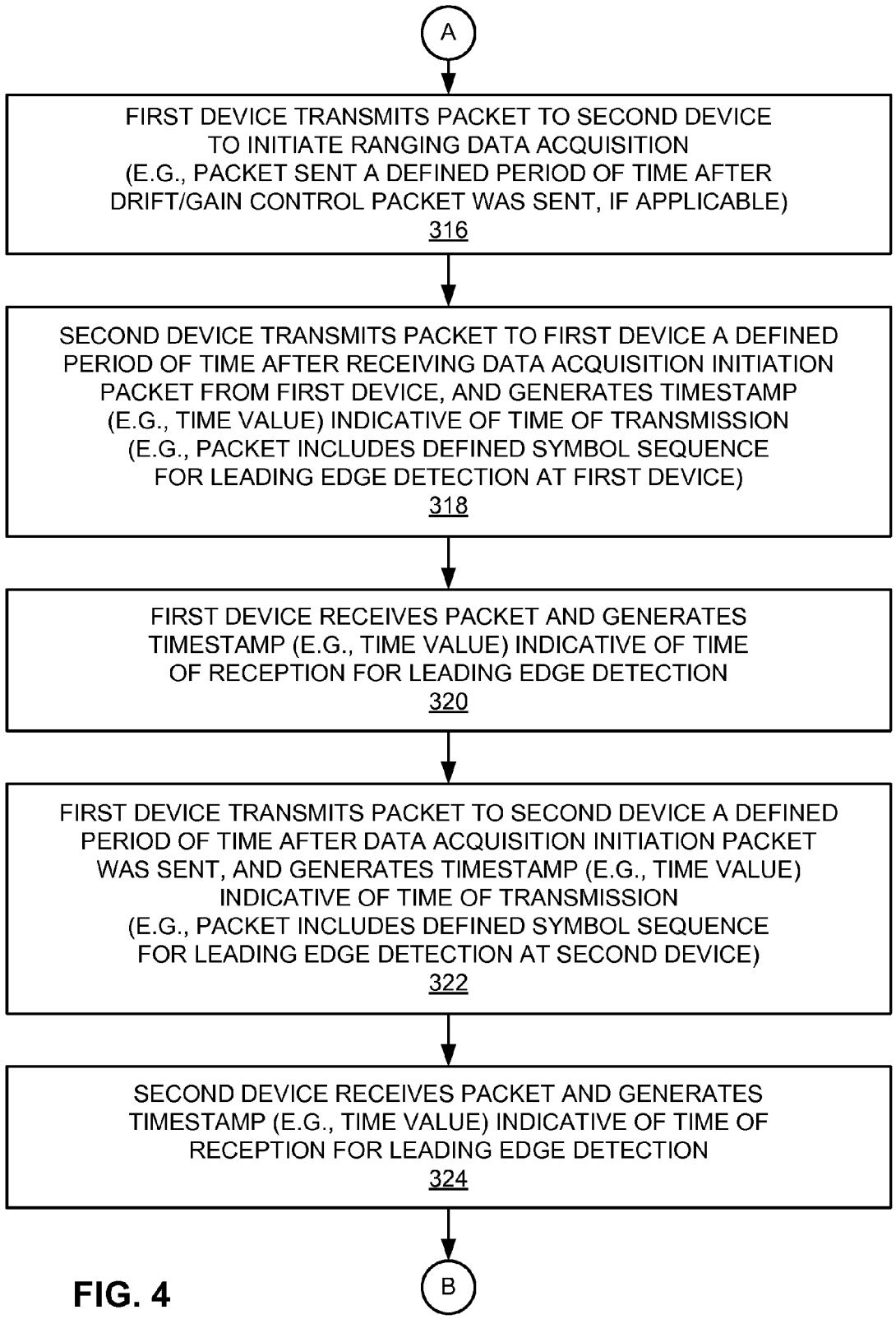
Figure 7:
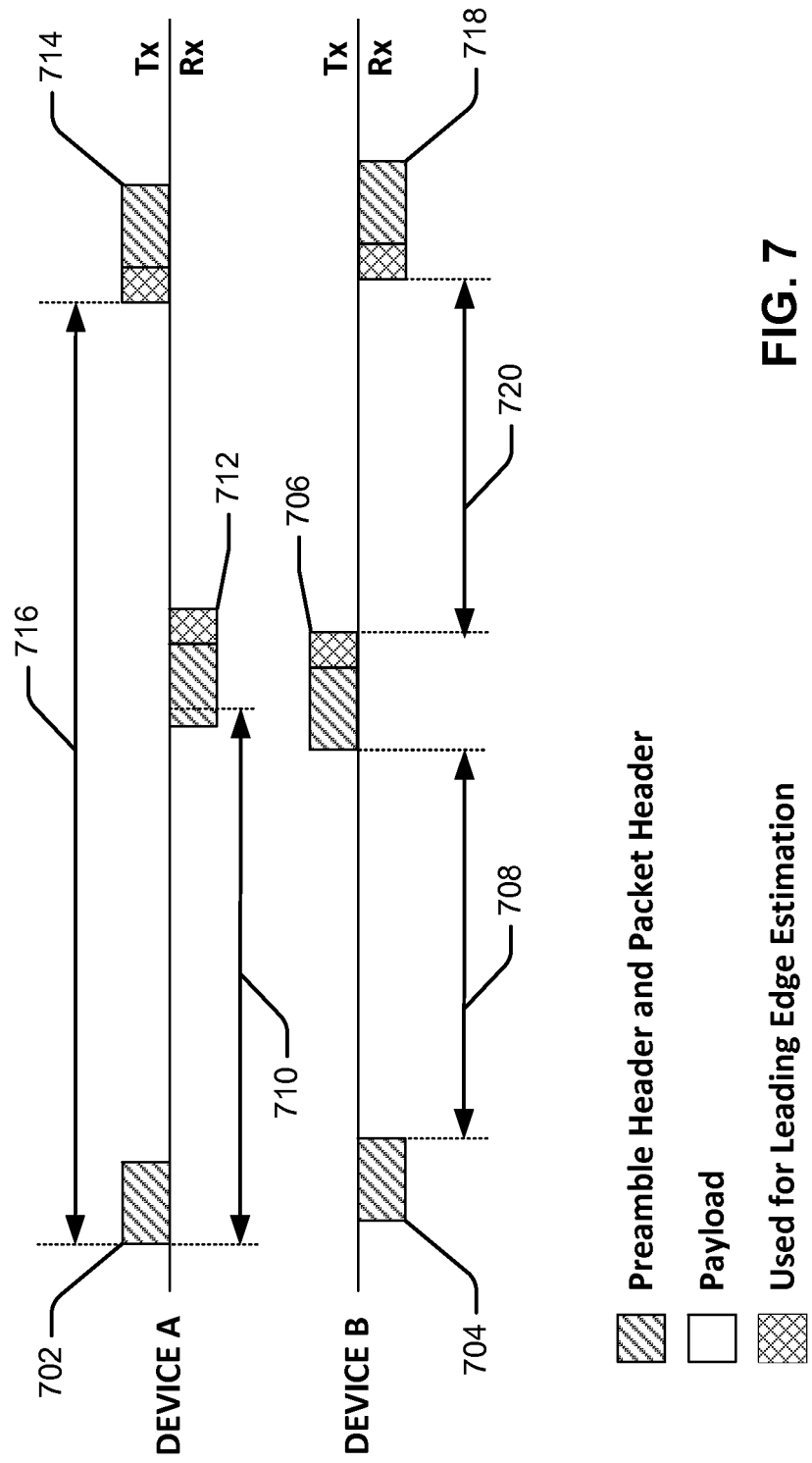
FIG. 7 is a simplified diagram illustrating sample messaging for two-way ranging data collection.

FIG. 4 illustrates sample data acquisition operations for leading edge estimation that may be performed by the first and second devices. FIG. 7 illustrates sample packets that may be sent by these devices in conjunction with these operations. The packets of FIG. 7 include a preamble header and packet header that may be used, for example, to facilitate acquisition of the transmitted pulses and to identify the packet. In addition, some of these packets include a payload (e.g., a defined symbol sequence) that is used for leading edge estimation.

As represented by block 316 of FIG. 4, the first device (device A) transmits a packet to the second device to initiate data acquisition for the ranging operation. In FIG. 7, this packet is represented by a packet 702 (the transmission of a packet by the device A) and a packet 704 (the reception of that packet at the device B). As shown in FIG. 7, the packet 702 may simply comprise a preamble header and packet header (e.g., that indicates that data acquisition for ranging is being initiated).

As represented by the time period 614 in FIG. 6, the first device may transmit the packet 702 a defined period of time (e.g., a specified number of clock cycles) after transmitting the packet 602. In this way, the second device may determine the time at which it should commence searching for the packet 704 (e.g., based on known timing parameters as discussed above).

As represented by block 318 of FIG. 4, as a result of the reception of the packet from the first device, the second device transmits a packet to the first device. For example, the second device may transmit the packet at block 318 if the second device successfully received the packet sent by the first device at block 316. As shown in FIG. 7, the second device may send a packet 706 that includes a preamble header and packet header (e.g., that identifies the packet as a data acquisition packet) and a payload for leading edge estimation at the first device. This leading edge estimation payload may comprise, for example, a defined symbol sequence (e.g., a pseudorandom sequence) that is known by the first and second devices.

The second device also generates an indication (hereafter referred to as a timestamp) that indicates when the second device transmitted the packet. This timestamp is used in the ranging algorithm to calculate the distance between devices as discussed herein. In some aspects, the timestamp generated at block 318 may correspond to the time $T_{1_B}$ discussed above. A timestamp may take various forms. In some implementations a timestamp may represent a system time. In some implementations a timestamp may represent the number of clock cycles relative to a defined point in time (e.g., the number of clock cycles that have occurred since the reception of the packet 604).

As represented by the time period 708 in FIG. 7, the second device may transmit the packet 706 a defined period of time (e.g., a specified number of clock cycles) after receiving the packet 704. For example, the packet 706 may be transmitted a number of clock cycles after the reception of the packet 704, where the counter of the clock cycles may be modified by a time tracking component of the second device (e.g., as discussed at block 310). In this way, the first device may determine the time at which it should commence searching for this packet.

The first device receives the packet from the second device as represented by block 320 of FIG. 4. Thus, the first device receives this packet as a result of transmitting the packet to the second device at block 316 (i.e., as a result of the second device transmitting the packet at block 318 upon successful receipt of the packet sent by the first device at block 316). In the example of FIG. 7, the packet 712 represents the reception of the packet 706 at the first device. Here, as represented by the time period 710, the first device commences signal acquisition operations a defined period of time (e.g., a specified number of clock cycles) after transmitting the packet 702 (e.g., based on known timing parameters as discussed above).

The first device also generates a timestamp that indicates when the first device received the packet from the second device. This timestamp is used in the ranging algorithm to calculate the distance between devices as discussed below. In some aspects, the timestamp generated at block 320 may correspond to the time $T_{2A}$ discussed above.

In some aspects, the timestamp generated at block 320 corresponds to the timing of a leading edge associated with the received packet. For example, the timestamp may correspond to a leading edge of the first pulse or last pulse of the payload of the packet 712. Thus, generation of the timestamp may involve, for example, detecting a leading edge of the symbol sequence of the packet payload and identifying a time of arrival of that leading edge.

Figure 8:
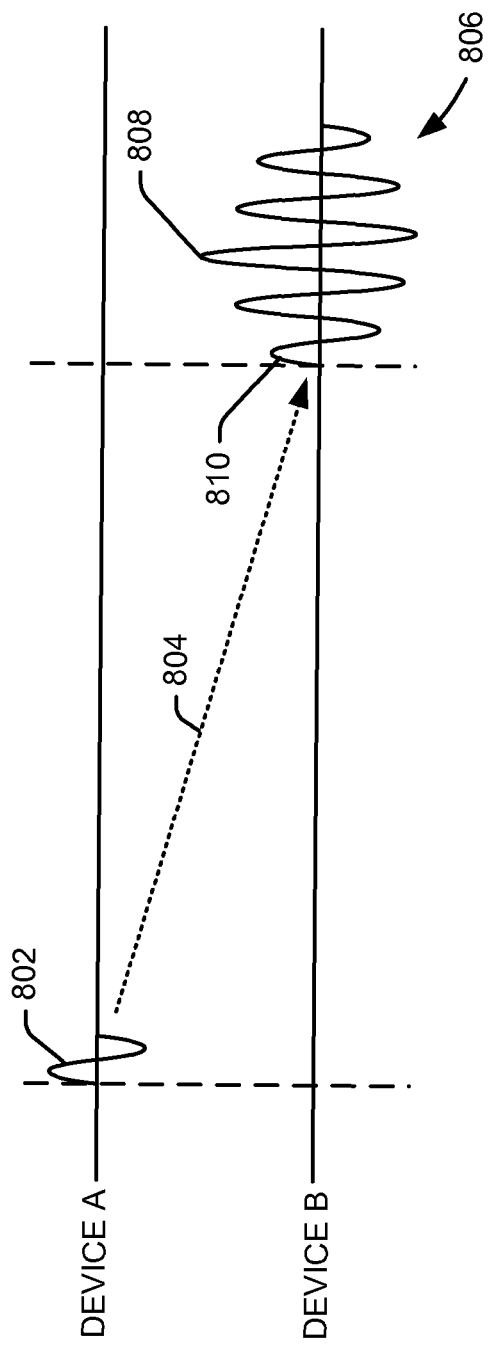
FIG. 8 is a simplified diagram illustrating sample detection of a leading edge of a pulse.

FIG. 8 illustrates how leading edge detection may differ from conventional signal detection (e.g., which may be used for data communication operations). Here, the device A sends a pulse 802 that is transmitted (as represented by arrow 804) to the device B. The pulse 806 represents the received pulse at the device B. In conventional signal detection, the typical acquisition point may correspond to the strongest signal path. Thus, for data communication purposes, the pulse 806 may be acquired at or near point 808. In contrast, for ranging purposes, the acquisition search may attempt to locate the leading edge 810 of the pulse 806. For example, in a multi-path scenario, the leading path of a pulse may be attenuated. Consequently, the leading path may be weaker than other paths.

As represented by block 322 of FIG. 4, as a result of the reception of the packet from the second device, the first device transmits a packet to the second device. As shown in FIG. 7, the first device may send a packet 714 that includes a preamble header and packet header and a payload for leading edge estimation at the first device (e.g., similar to the packet 706).

The first device also generates a timestamp that indicates when the first device transmitted the packet to the second device. This timestamp is used in the ranging algorithm to calculate the distance between devices as discussed below. In some aspects, the timestamp generated at block 322 may correspond to the time $T_{3A}$ discussed above.

As represented by the time period 716 in FIG. 7, the first device may transmit the packet 714 a defined period of time (e.g., a specified number of clock cycles) after transmitting the packet 702. In this way, the second device may determine the time at which it should commence searching for this packet.

The second device receives the packet from the first device as represented by block 324 of FIG. 4. In the example of FIG. 7, the packet 718 represents the reception of the packet 714 at the second device.

The second device also generates a timestamp that indicates when the second device received the packet from the first device. This timestamp is used in the ranging algorithm to calculate the distance between devices as discussed below. In some aspects, the timestamp generated at block 324 may correspond to the time $T_{4B}$ discussed above.

In some aspects, the timestamp generated at block 324 corresponds to the timing of a leading edge associated with the received packet. For example, the timestamp may correspond to a leading edge of the first pulse of the packet 718.

Figure 5:
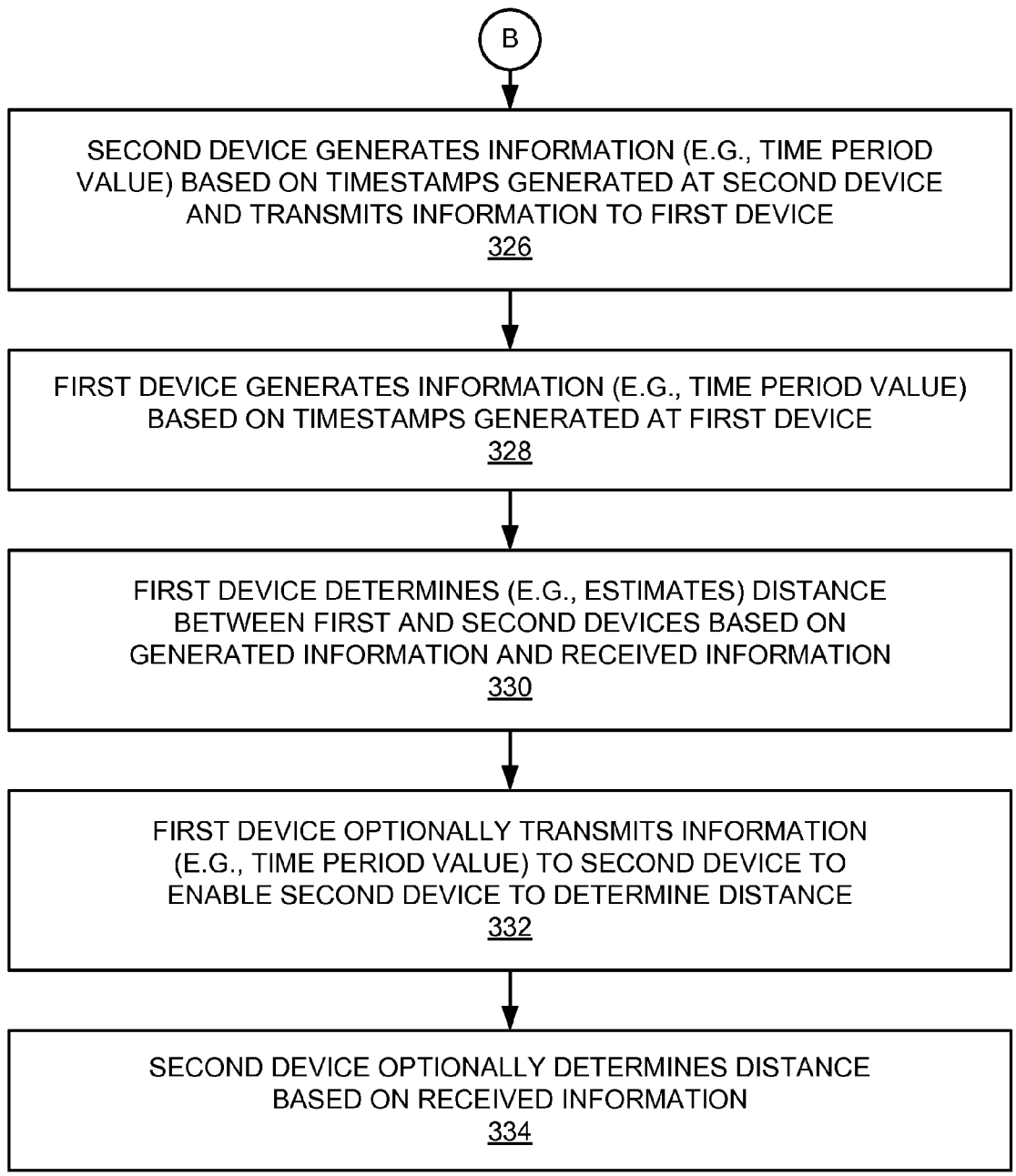

FIG. 5 illustrates sample operations that may be performed at the first and second devices to determine the distance between these devices.

As represented by block 326 of FIG. 5, the second device generates information based on the timestamps generated at blocks 318 and 324 (e.g., corresponding to time period 720 of FIG. 7) and transmits the information to the first device. This information may take various forms. In some cases, this information comprises a time period value indicative of the difference between the two timestamps. For example, the time period value may be defined as: $T_{4B}-T_{1B}$. In some cases, this information comprises indications of the two timestamps. For example, the information may be defined as time values corresponding to $T_{4B}$ and $T_{1B}$.

As represented by block 328, the first device generates information based on the timestamps generated at blocks 320 and 322. This information also may take various forms. In some cases, this information comprises a time period value indicative of the difference between the two timestamps. For example, the time period value may be defined as: $T_{3A}-T_{2A}$. In some cases, this information comprises indications of the two timestamps. For example, the information may be defined as time values corresponding to $T_{3A}$ and $T_{2A}$.

As represented by block 330, the first device determines the distance between the first and second devices based on the information generated at block 328 and the information received at block 326. For example, the first device may determine the propagation delay $T_P$ based on the formula: $2T_P=(T_{4B}-T_{1B})-(T_{3A}-T_{2A})$, and then determine the distance D based on the formula: $D=T_P*C$.

As represented by block 332, in some implementations, the first device transmits information to the second device to enable the second device to determine the distance between the first and second devices. For example, this information may comprise the time period value based on $T_{3A}-T_{2A}$ or the time values corresponding to $T_{3A}$ and $T_{2A}$.

As represented by block 334, the second device may then determine the distance between the first and second devices based on the received information. For example, the second device may utilize the formulas discussed at block 330.

From the above, it may be seen that the propagation delay may be determined three different ways. In a first case, the first device sends the time difference $T_{3A}-T_{2A}$ to the second device and the second device computes the propagation delay. In a second case, the second device sends the time difference $T_{4B}-T_{1B}$ to the first device and the first device computes the propagation delay. In a third case, the first and second devices exchange the time difference information and each device computes the propagation delay. Also, in the first case, the second device may send the computed propagation delay to the first device. Similarly, in the second case, the first device may send the computed propagation delay to the second device.

Figure 9:
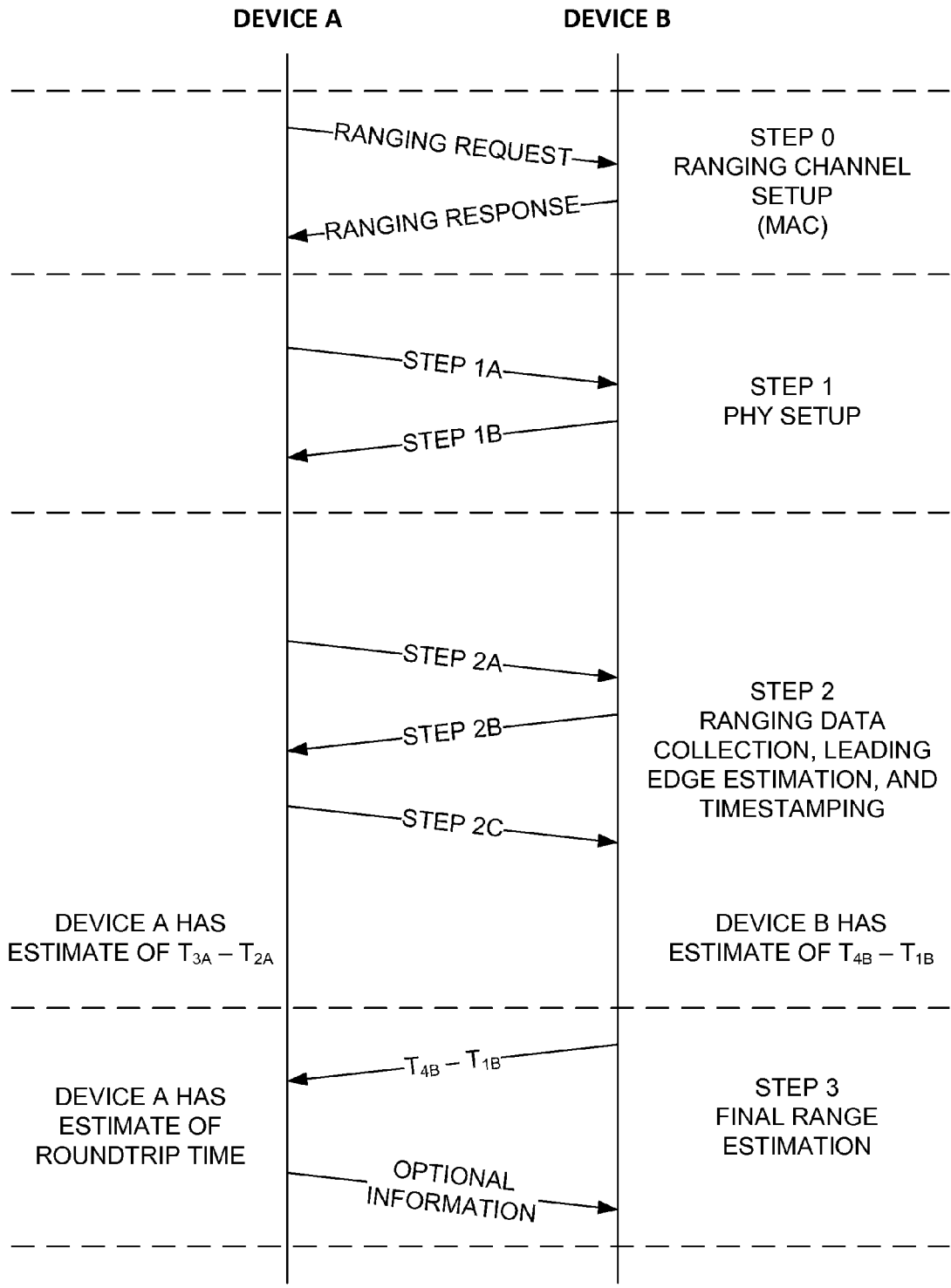
FIG. 9 is a simplified diagram illustrating sample messaging for two-way ranging.

With the above in mind, additional details that may be employed in conjunction with ranging operations will be described in conjunction with FIG. 9. This figure describes sample messaging flow between a pair of devices (the devices A and B) in a series of steps. At step 0, media access control (MAC) commands are used to set up the two devices prior to the start of a physical layer (PHY) algorithm at steps 1 and 2. Step 3 corresponds to final range estimation and exchange operations whereby the distance between the devices is calculated.

At step 0, the devices A and B communicate at the MAC layer to setup a ranging MAC channel between the devices. Here, the device A sends a MAC command (ranging request) to the device B that requests the device B to enter a ranging mode. If the device B agrees to enter the ranging mode, the device B responds with a MAC command (ranging response), whereupon the PHY algorithm is initiated. Thus, in some aspects, these operations may correspond to the operations described above in conjunction with blocks 302 and 304.

At step 1, the devices A and B communicate to set up the physical layer (PHY) between the devices. This communication exchange may occur in a ranging MAC channel, a logical channel set up to conduct the packet exchanges for the ranging algorithm, or in some other suitable manner. Here, the PHY layer estimates the parameters to be used to enable the ranging algorithms to function accurately. In particular, the relative drift between the devices is estimated by the device B and the devices A and B estimate the receive gain levels to be used during step 2. At step 1A, the device A sends a packet (e.g., packet 602) to the device B. At step 1B, the device B responds with a packet (e.g., packet 606). Thus, in some aspects, these operations may correspond to the operations described above in conjunction with blocks 306-314.

An interval is provided between steps 1 and 2 to allow for delays dues to, for example, computations, setup, or other operations.

At step 2, the data used to compute the leading edges of received pulses is collected by the devices A and B. Thus, in some aspects, these operations may correspond to the operations described above in conjunction with blocks 316-324.

At step 2A, the device A sends a packet (e.g., packet 702) on the ranging MAC channel. An interval (e.g., time period 708) is provided before the next transmission by the device B.

At step 2B, the device B sends a packet (e.g., packet 706) on the ranging MAC channel. The payload of this packet is used by the device A to collect the pulse data for the ranging algorithm at the device A. Here, both devices timestamp the first pulse of the payload of this packet. The timestamp by the device B is an estimate of $T_{1B}$, within some calibration delay adjustment. The timestamp by the device A is a rough estimate of $T_{2A}$. This timestamp is refined by the ranging algorithm to provide a more precise estimate of $T_{2A}$.

At step 2C, the device A sends a packet (e.g., packet 714) on the ranging MAC channel. The payload of this packet is used by the device B to collect the pulse data for the ranging algorithm at the device B. Here, both devices timestamp the first pulse of this packet. The timestamp by the device A is an estimate of $T_{3A}$, within some calibration delay adjustment. The timestamp by the device B is a rough estimate of $T_{4B}$. This timestamp is refined by the ranging algorithm to provide a more precise estimate of $T_{4B}$.

Ranging algorithms at the devices A and B then compute the time intervals corresponding to $T_{3A}-T_{2A}$ and $T_{4B}-T_{1B}$, respectively. Specifically, the ranging algorithm at the device A estimates $T_{3A}-T_{2A}$ based on the data collected at step 2B at the device A. Similarly, the ranging algorithm at the device B estimates $T_{4B}-T_{1B}$ based on the data collected at step 2C at the device B.

At step 3, the device B sends the estimate for $T_{4B}-T_{1B}$ to the device A (e.g., via a MAC channel associated with the device A). The device A then estimates the roundtrip time and, based on the roundtrip time, computes the distance between the devices A and B. In addition, in cases where the device B also determines the distance between the devices, the device A may send the estimated roundtrip time to the device B (e.g., via a MAC channel associated with the device B).

Figure 10:
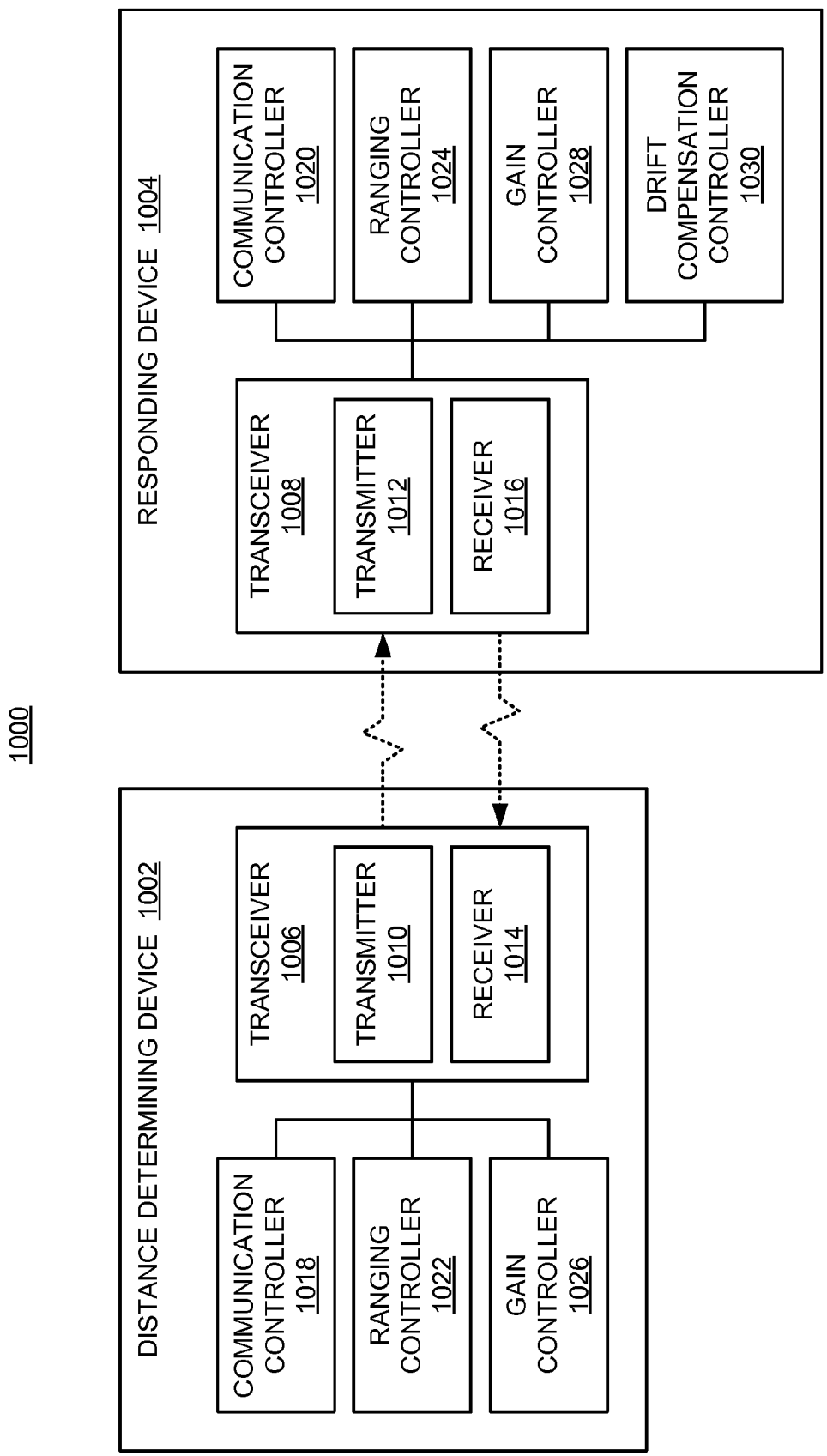
FIG. 10 is a simplified block diagram of several sample aspects of components that may be employed in communication apparatuses.

FIG. 10 illustrates several sample components that may be incorporated into devices such as a distance determining device 1002 (e.g., corresponding to the device 202) and a responding device 1004 (e.g., corresponding to the device 204). It should be appreciated that the functionality of any of the components of a given device as described herein may be implemented in one or more components (e.g., one or more of these components may be implemented within a single controller).

The devices 1002 and 1004 include transceivers 1006 and 1008, respectively, for sending data to and receiving data from each other (and/or one or more other devices, not shown). Here, the transceivers 1006 and 1008 include respective transmitters 1010 and 1012 for transmitting signals (e.g., pulses, packets, messages, information, and so on) and respective receivers 1014 and 1016 for receiving signals.

The devices 1002 and 1004 also include other components that provide functionality relating to ranging operations. For example, communication controllers 1018 and 1020 may provide functionality that supports communication between devices (e.g., establishing ranging channels, generating and processing packets, sending and receiving messages, and so on). Ranging controllers 1022 and 1024 may perform operations relating to determining the distance between the devices and 1002 and 1004 by causing appropriate signals (e.g., packets) to be sent between these devices and analyzing corresponding received signals (e.g., packets). To this end, the ranging controllers 1022 and 1024 may perform operations relating to the detection of leading edges of received packets and timestamp-related processing (e.g., determining time values, determining time period values, generating timestamps, or generating other related information). Gain controllers 1026 and 1028 may provide functionality for determining gain levels to be used for receiving packets (e.g., based on a received gain control payload) and adjusting gain (e.g., RF receiver gain) based on the determined gain levels. A drift compensation controller 1030 may provide functionality relating to clock drift compensation (e.g., detecting clock drift based on a clock drift estimation payload and adjusting a clock based on the detected clock drift).

For convenience, the devices 1002 and 1004 are shown in FIG. 10 as including components that may be used in the various examples described herein in conjunction with FIGS. 3-9. In practice, one or more of the illustrated components may not be used in a given case or may be used in another way. As an example, in some implementations the device 1004 may not comprise the drift compensation controller 1030. In addition, in some implementations the device 1002 may include a drift compensation controller.

Also, in some implementations the components of FIG. 10 may be implemented in one or more processors (e.g., that uses and/or incorporates data memory for storing information or code used by the processor(s) to provide this functionality). For example, the functionality of blocks 1018, 1022, and 1026 may be implemented by a processor or processors of a given device and data memory of that device (e.g., by execution of appropriate code and/or by appropriate configuration of processor components). Similarly, the functionality of blocks 1020, 1024, 1028, and 1030 may be implemented by a processor or processors of a given device and data memory of that device (e.g., by execution of appropriate code and/or by appropriate configuration of processor components).

Figure 11:
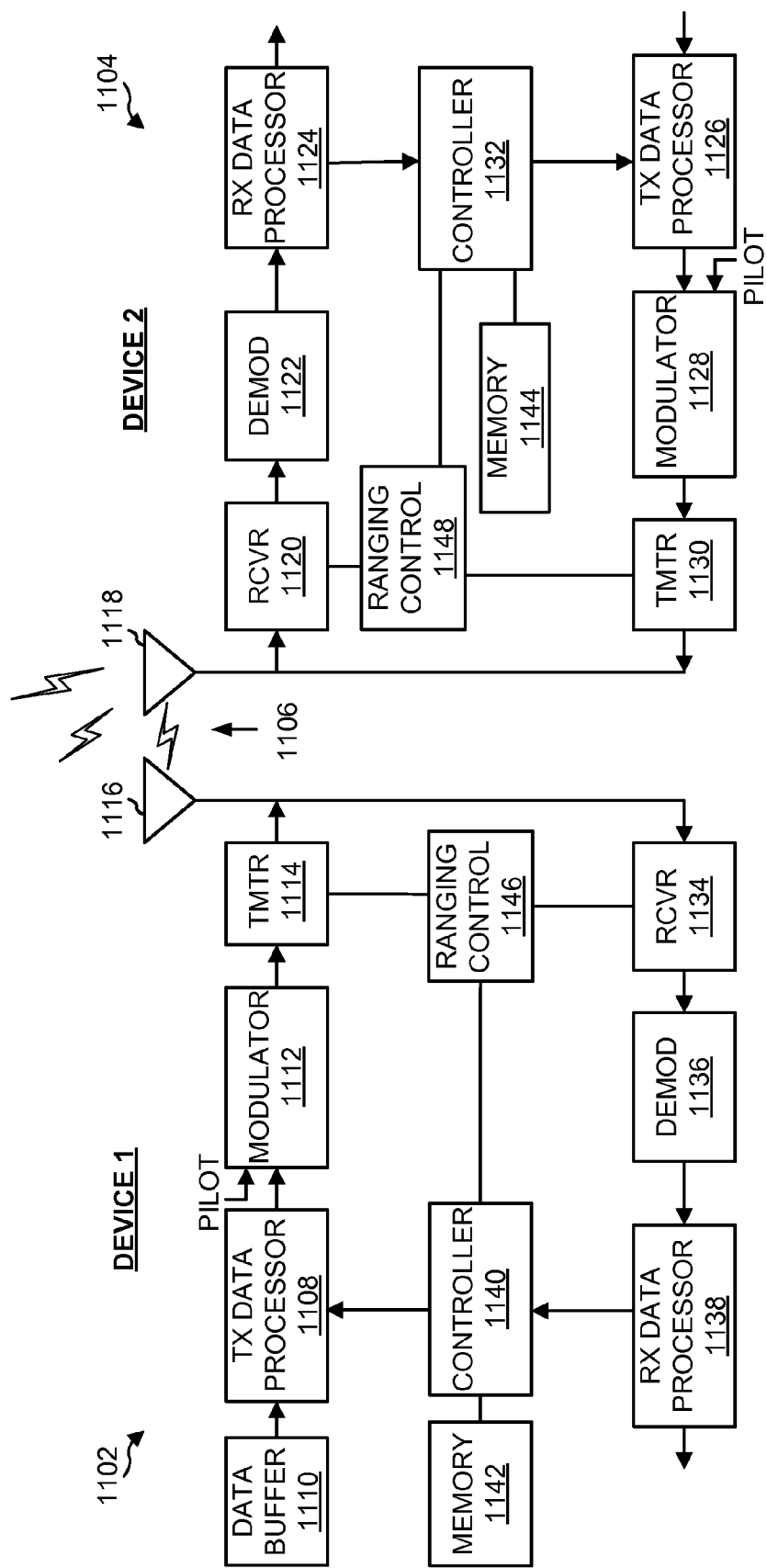
FIG. 11 is a simplified block diagram of several sample aspects of communication components.

The teachings herein may be incorporated into a device employing various components for communicating with at least one other device. FIG. 11 depicts several sample components that may be employed to facilitate communication between devices. Here, a first device 1102 and a second device 1104 are adapted to communicate via a wireless communication link 1106 over a suitable medium.

Initially, components involved in sending information from the device 1102 to the device 1104 will be treated. A transmit (TX) data processor 1108 receives traffic data (e.g., data packets) from a data buffer 1110 or some other suitable component. The transmit data processor 1108 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1112 receives the data symbols, pilot symbols, and possibly signaling for a link, and performs modulation (e.g., OFDM or some other suitable modulation) and/or other processing as specified by the system, and provides a stream of output chips. A transmitter (TMTR) 1114 processes (e.g., converts to analog, filters, amplifies, and frequency upconverts) the output chip stream and generates a modulated signal, which is then transmitted from an antenna 1116.

The modulated signals transmitted by the device 1102 (along with signals from other devices in communication with the device 1104) are received by an antenna 1118 of the device 1104. A receiver (RCVR) 1120 processes (e.g., conditions and digitizes) the received signal from the antenna 1118 and provides received samples. A demodulator (DEMOD) 1122 processes (e.g., demodulates and detects) the received samples and provides detected data symbols, which may be a noisy estimate of the data symbols transmitted to the device 1104 by the other device(s). A receive (RX) data processor 1124 processes (e.g., symbol demaps, deinterleaves, and decodes) the detected data symbols and provides decoded data associated with each transmitting device (e.g., device 1102).

Components involved in sending information from the device 1104 to the device 1102 will now be described. At the device 1104, traffic data is processed by a transmit (TX) data processor 1126 to generate data symbols. A modulator 1128 receives the data symbols, pilot symbols, and signaling for a link, performs modulation (e.g., OFDM or some other suitable modulation) and/or other pertinent processing, and provides an output chip stream, which is further conditioned by a transmitter (TMTR) 1130 and transmitted from the antenna 1118. In some implementations signaling for the link may include power control commands and other information (e.g., relating to a communication channel) generated by a controller 1132 for all devices (e.g. terminals) transmitting on the link to the device 1104.

At the device 1102, the modulated signal transmitted by the device 1104 is received by the antenna 1116, conditioned and digitized by a receiver (RCVR) 1134, and processed by a demodulator (DEMOD) 1136 to obtain detected data symbols. A receive (RX) data processor 1138 processes the detected data symbols and provides decoded data for the device 1102 and the link signaling. A controller 1140 receives power control commands and other information to control data transmission and to control transmit power on the link to the device 1104.

The controllers 1140 and 1132 direct various operations of the device 1102 and the device 1104, respectively. For example, a controller may determine an appropriate filter, reporting information about the filter, and decode information using a filter. Data memories 1142 and 1144 may store program codes and data used by the controllers 1140 and 1132, respectively.

FIG. 11 also illustrates that the communication components may include one or more components that perform ranging-related operations as taught herein. For example, a ranging control component 1146 may cooperate with the controller 1140 and/or other components of the device 1102 to send/receive ranging information to/from another device (e.g., device 1104). Similarly, a ranging control component 1148 may cooperate with the controller 1132 and/or other components of the device 1104 to send/receive ranging information to/from another device (e.g., device 1102). It should be appreciated that for each device 1102 and 1104 the functionality of two or more of the described components may be provided by a single component. For example, a single processing component may provide the functionality of the ranging control component 1146 and the controller 1140 and a single processing component may provide the functionality of the ranging control component 1148 and the controller 1132.

A wireless device may include various components that perform functions based on signals that are transmitted by or received at the wireless device. For example, a wireless headset may include a transducer configured to provide an audio output based on a determined distance and/or information indicative of one or more time values. A wireless watch may include a user interface configured to provide an indication based on a determined distance and/or information indicative of one or more time values. A wireless sensing device may include a sensor configured to provide data for transmission as a result of a determined distance or as a result of the generation of information (e.g., information indicative of distance or timing). In some cases (e.g., medical applications), a sensor may be configured to perform an action (e.g., start sensing, stop sensing, commence transmission of previously sensed information, etc.) based on ranging-related operations. For example, such action may be initiated if it is determined that two devices are within, are at, or are not within a defined distance from one another. Also, such action may be initiated as a result of two devices generating and/or exchanging ranging-related information (e.g., the generation of information at a first device leads to a second device determining a distance, wherein, upon learning of the determined distance, the first device initiates some action). As another example, ranging may be employed to determine where to send sensed information (e.g., in a case where a device is sensing patient biometrics or other information). Also, ranging implemented in a handheld unit for medical personnel may be employed to determine whether the medical personnel is near a patient. If so, the handheld unit may be configured to perform an appropriate action (e.g., pull the patient's data from a back-end server). Also, in some aspects a sensor may be employed to make ranging measurements. In addition, ranging may be used to sense motion or to determine if an object obstructs the line of sight between two devices. Hence, the ranging measurement may comprise a form of sensing performed by a sensor.

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 1010 and receiver 1012) that may include various components (e.g., signal generators and signal processors) that facilitate communication over a wireless medium.

In some aspects a wireless device may communicate via an impulse-based wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), an entertainment device (e.g., a music or video device), a headset (e.g., headphones, an earpiece, etc.), a microphone, a medical sensing device (e.g., a sensor such as a biometric sensor, a heart rate monitor, a pedometer, an EKG device, a smart bandage, a vital signal monitor, etc.), a user I/O device (e.g., a watch, a remote control, a switch such as a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, a gaming device, or any other suitable device. The communication devices described herein may be used in any type of sensing application, such as for sensing automotive, athletic, and physiological (medical) responses. Any of the disclosed aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitudes of applications that may incorporate any aspect of the disclosure as described herein.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses). As an example, in some implementations the width of each pulse may be on the order of 1 nanosecond or less (e.g., 100 picoseconds), while the pulse repetition interval may be on the order of 100 nanoseconds to 10 microseconds. It should be appreciated that these numbers are merely representative and that a given impulse-based system may employ different pulse widths and/or pulse repetition intervals.

Various types of modulation schemes may be used with an impulse-based signaling scheme. For example, some implementations may employ pulse position modulation (PPM). In addition, some implementations may employ pulse time hopping (e.g., based on pseudorandom sequence).

In some aspects a wireless device may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless device also may be capable of transmitting and/or receiving information in a non-wireless manner (e.g., via a wired connection) via an appropriate communication interface.

Figure 12:
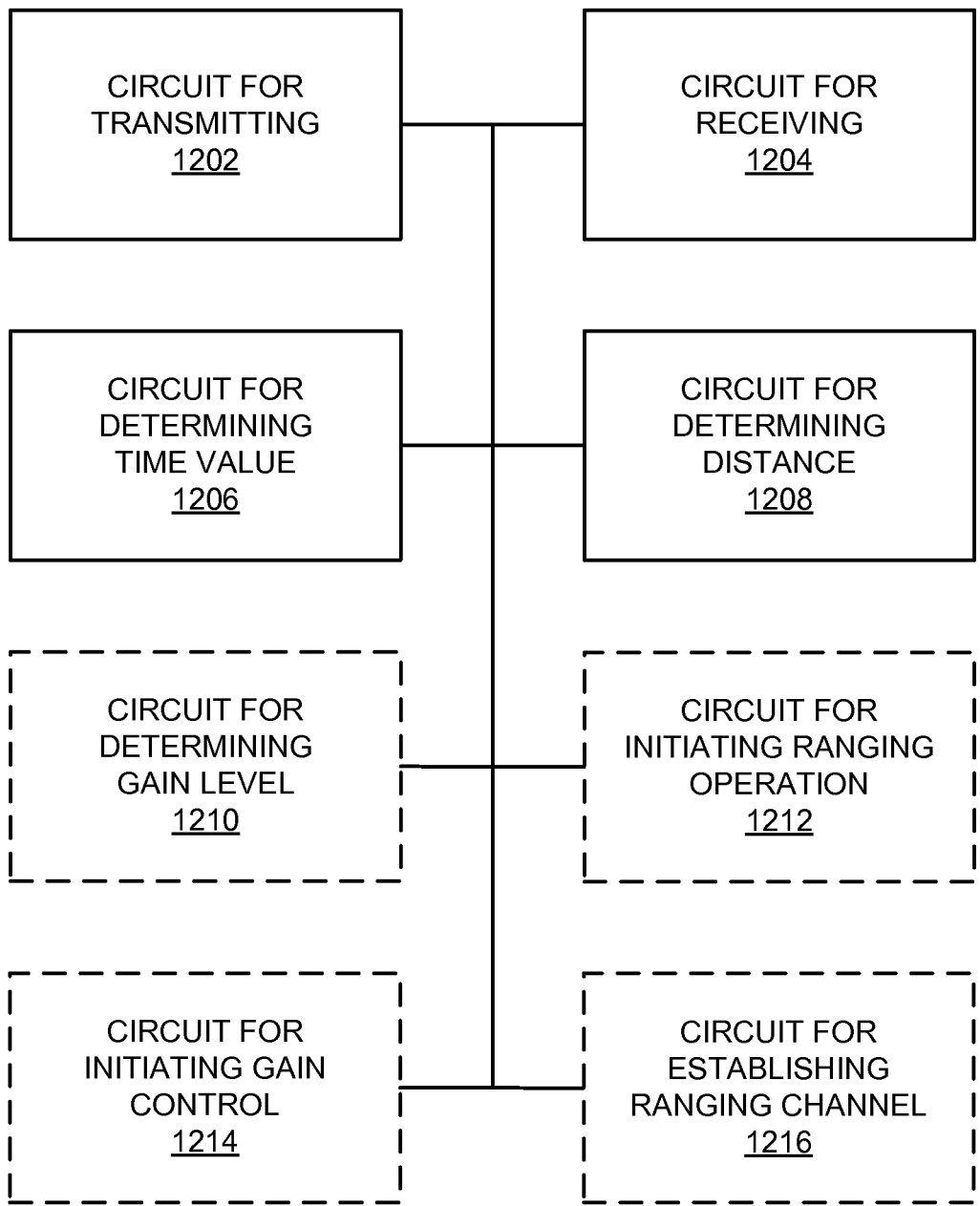
FIGS. 12 and 13 are simplified block diagrams of several sample aspects of apparatuses configured to provide ranging as taught herein.
Figure 13:
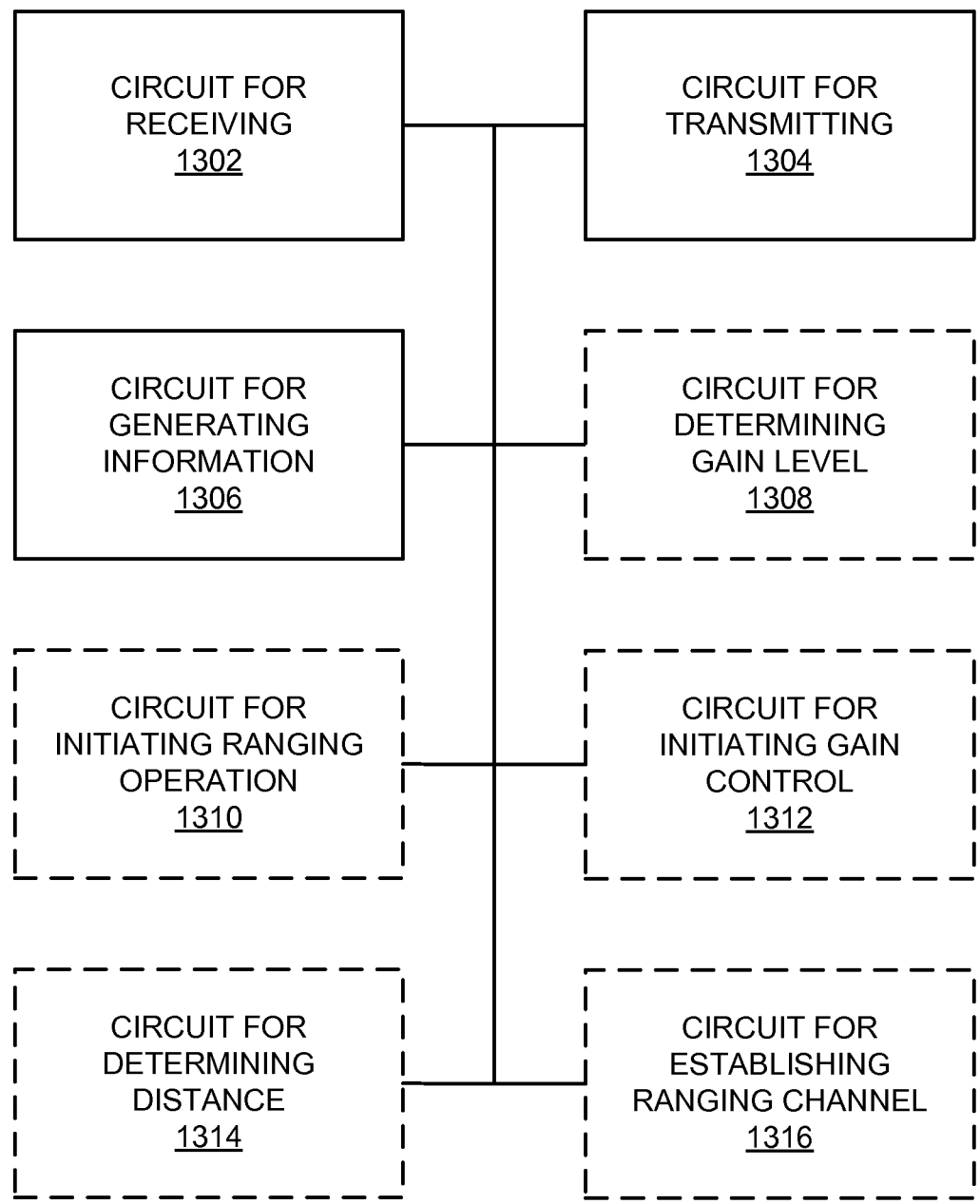

The components described herein may be implemented in a variety of ways. Referring to FIGS. 12 and 13, apparatuses 1200 and 1300 are represented as a series of interrelated functional blocks that may represent functions implemented by, for example, one or more circuits (e.g., an integrated circuit such as an ASIC) or may be implemented in some other manner as taught herein. As discussed herein, a circuit may include a processor, software, other components, or some combination thereof.

The apparatuses 1200 and 1300 may include one or more modules that may perform functionality as described herein (e.g., with regard to one or more of the accompanying figures) and that may correspond in some aspects to similarly designated "means for" functionality in the appended claims. For example, a circuit for transmitting 1202 may correspond to, for example, a transmitter as discussed herein. A circuit for receiving 1204 may correspond to, for example, a receiver as discussed herein. A circuit for determining time value 1206 may correspond to, for example, a ranging controller as discussed herein. A circuit for determining distance 1208 may correspond to, for example, a ranging controller as discussed herein. A circuit for determining gain level 1210 may correspond to, for example, a gain controller as discussed herein. A circuit for initiating ranging operation 1212 may correspond to, for example, a ranging controller as discussed herein. A circuit for initiating gain control 1214 may correspond to, for example, a gain controller as discussed herein. A circuit for establishing ranging channel 1216 may correspond to, for example, a communication controller as discussed herein. A circuit for receiving 1302 may correspond to, for example, a receiver as discussed herein. A circuit for transmitting 1304 may correspond to, for example, a transmitter as discussed herein. A circuit for generating information 1306 may correspond to, for example, a ranging controller as discussed herein. A circuit for determining gain level 1308 may correspond to, for example, a gain controller as discussed herein. A circuit for initiating ranging operation 1310 may correspond to, for example, a ranging controller as discussed herein. A circuit for initiating gain control 1312 may correspond to, for example, a gain controller as discussed herein. A circuit for determining distance 1314 may correspond to, for example, a ranging controller as discussed herein. A circuit for establishing ranging channel 1316 may correspond to, for example, a communication controller as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of any components represented by dashed boxes are optional.

As noted above, the apparatuses 1200 and 1300 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 12 and 13 as well as other components and functions described herein, may be implemented using any suitable means. Such means also may be implemented, at least in part, using corresponding structure as taught herein. For example, the components described above in conjunction with the "circuit for" components of FIGS. 12 and 13 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof"

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
   transmitting a first packet from a first apparatus to a second apparatus;
   receiving a second packet from the second apparatus as a result of the transmission of the first packet;
   transmitting a third packet from the first apparatus to the second apparatus after the reception of the second packet;
   determining a first time value associated with the reception of the second packet and a second time value associated with the transmission of the third packet;
   receiving information from the second apparatus, wherein the information is indicative of a third time value associated with the transmission of the second packet and a fourth time value associated with the reception of the third packet;
   determining a distance between the first apparatus and the second apparatus based on the first time value, the second time value, and the received information;
   transmitting a fourth packet from the first apparatus to the second apparatus;
   receiving a fifth packet from the second apparatus, wherein the fifth packet comprises a first symbol sequence for gain control at the first apparatus; and
   determining a gain level for the reception of the second packet based on the first symbol sequence.

2. The method of claim 1, wherein the third packet is transmitted a defined period of time after the transmission of the first packet.

3. The method of claim 1, wherein:
   the second packet comprises a second symbol sequence for a leading edge detection operation at the first apparatus; and
   the determination of the first time value comprises detecting a leading edge associated with the second symbol sequence and determining a time of arrival of the leading edge.

4. The method of claim 3, wherein:
   the third packet comprises a third symbol sequence for a leading edge detection operation at the second apparatus; and
   the third symbol sequence comprises the beginning of the third packet.

5. The method of claim 1, wherein the transmission of the first packet provides a timing indication for triggering the second apparatus to transmit the second packet.

6. The method of claim 1, wherein the fifth packet is received as a result of the transmission of the fourth packet.

7. The method of claim 1, wherein:
   the fourth packet comprises a second symbol sequence for gain control at the second apparatus; and
   the fourth packet is transmitted a defined period of time before the transmission of the first packet.

8. The method of claim 7, wherein the fourth packet further comprises a third symbol sequence for clock drift estimation at the second apparatus.

9. The method of claim 1, further comprising:
   initiating a ranging operation at the first apparatus; and
   initiating the gain control at the first apparatus as a result of the initiation of the ranging operation at the first apparatus.

10. The method of claim 1, further comprising:
    initiating a ranging operation at the first apparatus; and
    establishing at least one ranging channel as a result of the initiation of the ranging operation at the first apparatus, wherein the at least one ranging channel is established for the transmission of at least the first and third packets and the reception of at least the second packet.

11. The method of claim 10, wherein the establishment of the at least one ranging channel comprises defining at least one of the group consisting of: a pulse repetition period and a pulse time hopping sequence.

12. An apparatus for wireless communication, comprising:
    a transmitter configured to transmit a first packet to another apparatus;
    a receiver configured to receive a second packet from the another apparatus as a result of the transmission of the first packet, wherein the transmitter is further configured to transmit a third packet to the another apparatus after the reception of the second packet;
    a ranging controller configured to determine a first time value associated with the reception of the second packet and a second time value associated with the transmission of the third packet, wherein the ranging controller is further configured to determine a distance between the apparatus and the another apparatus based on the first time value, the second time value, and information received from the another apparatus that is indicative of a third time value associated with the transmission of the second packet and a fourth time value associated with the reception of the third packet, wherein:
    the transmitter is further configured to transmit a fourth packet to the another apparatus;
    the receiver is further configured to receive a fifth packet from the another apparatus;
    the fifth packet comprises a first symbol sequence for gain control at the apparatus; and
    a gain controller configured to determine a gain level for the reception of the second packet based on the first symbol sequence.

13. The apparatus of claim 12, wherein the third packet is transmitted a defined period of time after the transmission of the first packet.

14. The apparatus of claim 12, wherein:
the second packet comprises a second symbol sequence for a leading edge detection operation at the apparatus; and
the determination of the first time value comprises detecting a leading edge associated with the second symbol sequence and determining a time of arrival of the leading edge.

15. The apparatus of claim 14, wherein:
the third packet comprises a third symbol sequence for a leading edge detection operation at the another apparatus; and
the third symbol sequence comprises the beginning of the third packet.

16. The apparatus of claim 12, wherein the transmission of the first packet provides a timing indication for triggering the another apparatus to transmit the second packet.

17. The apparatus of claim 12, wherein the fifth packet is received as a result of the transmission of the fourth packet.

18. The apparatus of claim 12, wherein:
the fourth packet comprises a second symbol sequence for gain control at the another apparatus; and
the fourth packet is transmitted a defined period of time before the transmission of the first packet.

19. The apparatus of claim 18, wherein the fourth packet further comprises a third symbol sequence for clock drift estimation at the another apparatus.

20. The apparatus of claim 12, wherein:
the ranging controller is further configured to initiate a ranging operation; and
the gain controller is further configured to initiate the gain control at the apparatus as a result of the initiation of the ranging operation.

21. The apparatus of claim 12, wherein:
the ranging controller is further configured to initiate a ranging operation;
the apparatus further comprises a communication controller configured to establish at least one ranging channel as a result of the initiation of the ranging operation; and
the at least one ranging channel is established for the transmission of at least the first and third packets and the reception of at least the second packet.

22. The apparatus of claim 21, wherein the establishment of the at least one ranging channel comprises defining at least one of the group consisting of: a pulse repetition period and a pulse time hopping sequence.

23. An apparatus for wireless communication, comprising:
means for transmitting a first packet to another apparatus;
means for receiving a second packet from the another apparatus as a result of the transmission of the first packet, wherein the means for transmitting is configured to transmit a third packet to the another apparatus after the reception of the second packet;
means for determining a first time value associated with the reception of the second packet and a second time value associated with the transmission of the third packet;
means for determining a distance between the apparatus and the another apparatus based on the first time value, the second time value, and information received from the another apparatus that is indicative of a third time value associated with the transmission of the second packet and a fourth time value associated with the reception of the third packet, wherein:
the means for transmitting is configured to transmit a fourth packet to the another apparatus;
the means for receiving is configured to receive a fifth packet from the another apparatus;
the fifth packet comprises a first symbol sequence for gain control at the apparatus; and
means for determining a gain level for the reception of the second packet based on the first symbol sequence.

24. The apparatus of claim 23, wherein the third packet is transmitted a defined period of time after the transmission of the first packet.

25. The apparatus of claim 23, wherein:
the second packet comprises a second symbol sequence for a leading edge detection operation at the apparatus; and
the determination of the first time value comprises detecting a leading edge associated with the second symbol sequence and determining a time of arrival of the leading edge.

26. The apparatus of claim 25, wherein:
the third packet comprises a third symbol sequence for a leading edge detection operation at the another apparatus; and
the third symbol sequence comprises the beginning of the third packet.

27. The apparatus of claim 23, wherein the transmission of the first packet provides a timing indication for triggering the another apparatus to transmit the second packet.

28. The apparatus of claim 23, wherein the fifth packet is received as a result of the transmission of the fourth packet.

29. The apparatus of claim 23, wherein:
the fourth packet comprises a second symbol sequence for gain control at the another apparatus; and
the fourth packet is transmitted a defined period of time before the transmission of the first packet.

30. The apparatus of claim 29, wherein the fourth packet further comprises a third symbol sequence for clock drift estimation at the another apparatus.

31. The apparatus of claim 23, further comprising:
means for initiating a ranging operation; and
means for initiating the gain control at the apparatus as a result of the initiation of the ranging operation.

32. The apparatus of claim 23, further comprising:
means for initiating a ranging operation; and
means for establishing at least one ranging channel as a result of the initiation of the ranging operation; wherein the at least one ranging channel is established for the transmission of at least the first and third packets and the reception of at least the second packet.

33. The apparatus of claim 32, wherein the establishment of the at least one ranging channel comprises defining at least one of the group consisting of: a pulse repetition period and a pulse time hopping sequence.

34. A computer-program product for wireless communication, comprising:
computer-readable storage device comprising codes executable to:
transmit a first packet from a first apparatus to a second apparatus;
receive a second packet from the second apparatus as a result of the transmission of the first packet;
transmit a third packet from the first apparatus to the second apparatus after the reception of the second packet;
determine a first time value associated with the reception of the second packet and a second time value associated with the transmission of the third packet;
receive information from the second apparatus, wherein the information is indicative of a third time value associated with the transmission of the second packet and a fourth time value associated with the reception of the third packet;

determine a distance between the first apparatus and the second apparatus based on the first time value, the second time value, and the received information;

transmit a fourth packet from the first apparatus to the second apparatus;

receive a fifth packet from the second apparatus, wherein the fifth packet comprises a first symbol sequence for gain control at the first apparatus; and determine a gain level for the reception of the second packet based on the first symbol sequence.

35. A headset, comprising:

a transmitter configured to transmit a first packet to an apparatus;

a receiver configured to receive a second packet from the apparatus as a result of the transmission of the first packet, wherein the transmitter is further configured to transmit a third packet to the apparatus a defined period of time after the reception of the second packet;

a ranging controller configured to determine a first time value associated with the reception of the second packet and a second time value associated with the transmission of the third packet, wherein the ranging controller is further configured to determine a distance between the headset and the apparatus based on the first time value, the second time value, and information received from the apparatus that is indicative of a third time value associated with the transmission of the second packet and a fourth time value associated with the reception of the third packet, wherein:

the transmitter is further configured to transmit a fourth packet to the apparatus;

the receiver is further configured to receive a fifth packet from the apparatus;

the fifth packet comprises a first symbol sequence for gain control at the headset; and a gain controller configured to determine a gain level for the reception of the second packet based on the first symbol sequence; and a transducer configured to provide an audio output based on the determined distance.

36. A watch, comprising:

a transmitter configured to transmit a first packet to an apparatus;

a receiver configured to receive a second packet from the apparatus as a result of the transmission of the first packet, wherein the transmitter is further configured to transmit a third packet to the apparatus a defined period of time after the reception of the second packet;

a ranging controller configured to determine a first time value associated with the reception of the second packet and a second time value associated with the transmission of the third packet, wherein the ranging controller is further configured to determine a distance between the watch and the apparatus based on the first time value, the second time value, and information received from the apparatus that is indicative of a third time value associated with the transmission of the second packet and a fourth time value associated with the reception of the third packet, wherein:

the transmitter is further configured to transmit a fourth packet to the apparatus;

the receiver is further configured to receive a fifth packet from the apparatus;

the fifth packet comprises a first symbol sequence for gain control at the watch; and a gain controller configured to determine a gain level for the reception of the second packet based on the first symbol sequence; and a user interface configured to provide an indication based on the determined distance.

37. A sensing device, comprising:

a transmitter configured to transmit a first packet to an apparatus;

a receiver configured to receive a second packet from the apparatus as a result of the transmission of the first packet, wherein the transmitter is further configured to transmit a third packet to the apparatus a defined period of time after the reception of the second packet;

a ranging controller configured to determine a first time value associated with the reception of the second packet and a second time value associated with the transmission of the third packet, wherein the ranging controller is further configured to determine a distance between the sensing device and the apparatus based on the first time value, the second time value, and information received from the apparatus that is indicative of a third time value associated with the transmission of the second packet and a fourth time value associated with the reception of the third packet, wherein:

the transmitter is further configured to transmit a fourth packet to the apparatus;

the receiver is further configured to receive a fifth packet from the apparatus;

the fifth packet comprises a first symbol sequence for gain control at the sensing device; and a gain controller configured to determine a gain level for the reception of the second packet based on the first symbol sequence; and a sensor configured to provide data for transmission as a result of the determined distance.

* * * * *